United States Patent
Gerardin (10) Patent No.: US 10,089,279 B2
(45) Date of Patent: Oct. 2, 2018

(54) METHOD AND SYSTEM FOR AUTOMATIC DOCUMENT GENERATION FROM AN INDEX

(71) Applicant: VALIPAT SA, Brussels (BE)

(72) Inventor: Olivier Gerardin, Uccle (BE)

(73) Assignee: VALIPAT SA, Brussels (BE)

( * ) Notice: Subject to any disclaimer, the term of this patent is extended or adjusted under 35 U.S.C. 154(b) by 226 days.

(21) Appl. No.: 15/025,860

(22) PCT Filed: Oct. 14, 2014

(86) PCT No.: PCT/EP2014/072020
§ 371 (c)(1),
(2) Date: Mar. 29, 2016

(87) PCT Pub. No.: WO2015/055653
PCT Pub. Date: Apr. 23, 2015

(65) Prior Publication Data
US 2016/0239466 A1    Aug. 18, 2016

(30) Foreign Application Priority Data
Oct. 16, 2013  (EP) ..................................... 13188916

(51) Int. Cl.
*G06F 17/22*    (2006.01)
*G06F 17/21*    (2006.01)
(Continued)

(52) U.S. Cl.
CPC ........ *G06F 17/212* (2013.01); *G06F 17/2229* (2013.01); *G06F 17/243* (2013.01);
(Continued)

(58) Field of Classification Search
CPC .. G06F 17/2229; G06F 17/243; G06F 17/248; G06F 17/212; G06F 17/30979; G06F 17/30991; G06Q 50/18
See application file for complete search history.

(56) References Cited

U.S. PATENT DOCUMENTS 6,366,918 B1 *  4/2002  Guttman ................ G06N 3/126
                                                          707/690
7,240,047 B2 *  7/2007  Sang, Jr. ............... G06F 17/211
(Continued)

OTHER PUBLICATIONS

International Search Report on related PCT application (PCT/EP2014/072020) from International Searching Authority (EPO) dated Apr. 23, 2015.
(Continued)

*Primary Examiner* — Maikhanh Nguyen
(74) *Attorney, Agent, or Firm* — Klein, O'Neill & Singh, LLP (57) ABSTRACT

A method for the automatic generation of at least one document includes a step for selecting values of the first parameter and the second parameter so as to form a generation context, a step for consulting the static index so as to obtain the virtual document associated with said generation context, a step for making a request in the database for the layout and paragraphs pointed to by the virtual document obtained, and a step for generating said document in an electronic format, containing the paragraphs returned by said request and the layout returned by said request.

10 Claims, 2 Drawing Sheets

(51) Int. Cl.
*G06F 17/24* (2006.01)
*G06F 17/30* (2006.01)
*G06Q 50/18* (2012.01)

(52) U.S. Cl.
CPC ...... *G06F 17/248* (2013.01); *G06F 17/30979* (2013.01); *G06F 17/30991* (2013.01); *G06Q 50/18* (2013.01)

(56) References Cited

U.S. PATENT DOCUMENTS

| | | | |
|---|---|---|---|
| 7,823,057 B1* | 10/2010 | Schultz | G06F 17/30887 715/229 |
| 2004/0003097 A1* | 1/2004 | Willis | G06F 17/30867 709/228 |
| 2004/0012618 A1 | 1/2004 | Finney | |
| 2004/0030726 A1 | 2/2004 | Baxter et al. | |
| 2007/0061742 A1* | 3/2007 | Brooks | G06F 8/38 715/763 |
| 2011/0283186 A1 | 11/2011 | Caro et al. | |

OTHER PUBLICATIONS

"TexManager 5.0 Bedienungsanleitung", www.texmanager.de/; Aug. 13, 2012.

\* cited by examiner

METHOD AND SYSTEM FOR AUTOMATIC DOCUMENT GENERATION FROM AN INDEX

BACKGROUND

The present invention relates to the field of automatic document generation. The invention is particularly applicable to the automatic generation of documents such as powers of attorney or proxies which are intended to authorise a proxy to perform an action on behalf of a principal.

In many situations, an individual or legal entity is unable to carry out a specific action themselves, for practical reasons (distance, lack of time) and/or legal reasons (lack of authorisation to carry out this action oneself). This party thus needs to have this action carried out by another party, either an individual or legal entity, on its behalf.

By way of example, mention may be made of the proxy enabling an attorney or a firm of attorneys to represent a party before a national or regional jurisdiction in order to carry out legal and/or administrative procedures therein.

The management of such proxies can be a burden and complex in administrative terms. This is the case in particular in the common scenario wherein the party seeking to carry out an action before a plurality of jurisdictions contacts its usual attorney who is not himself authorised to perform said action in all the jurisdictions in question.

In such cases, the attorney relies on a network of attorneys authorised to represent his client before the various jurisdictions in question, and is responsible for having his client sign a different proxy for each jurisdiction wherein the action is to be carried out. This problem notably arises when performing procedures (filing, withdrawal, etc.) relating to patent, trademark or design and model applications.

In such a case, the attorney must contact the authorised parties one by one, receive the proxy forms one by one to be forwarded to the client (who issues the proxy) to sign, and then return them to the various attorneys in his network for the execution of the action before the various jurisdictions.

To simplify this management, systems and methods are known which are based on the collection of proxies which are scanned and stored in a database.

The management of such a proxy database is complex due to the fact that it must contain one document for each scenario liable to arise.

As such, the database must comprise equally well a general proxy relating to the filing of a patent in Europe in French and a specific proxy relating to the withdrawal of a trademark in Italy in Italian.

Such systems and methods simultaneously pose problems in respect of maintenance, information storage and retrieval efficiency, and use. In particular, with such systems or methods, amending a document requires said document be digitised again, which involves a drawback.

Furthermore, when an amendment applies to a group of documents, for example following a change of legislation in a particular jurisdiction, it is necessary to apply changes to each document concerned, which is time-consuming and/or a source of error.

Conventionally, the document to be generated includes a defined number of paragraphs, the content whereof is defined. Automatic document generation methods based on a paragraph database are known in the prior art. According to these methods, different paragraphs can be selected and associated together to form the document to be generated. By way of example, such a generation method to help draft contracts is known wherein a user accesses a computer interface using an Internet browser and selects the clauses to be added to the contract to be generated. During the generation of the contract, the paragraphs relating to the clauses selected are integrated automatically into a PDF type document.

Such a document generation method is suitable for automatically generating a single proxy for a given jurisdiction. Nevertheless, if the user seeks to obtain a proxy for another jurisdiction, the user must once again select the suitable paragraphs, which represents a waste of time.

Also, there is a need to automatically generate a plurality of documents based on a single input step by a user while enabling optimal database management.

In the prior art, various document generation methods are known wherein the paragraphs are pooled so as to limit the size of the paragraph database along with the maintenance thereof.

In practice, the generation methods according to the prior art require significant computing power. Furthermore, when a plurality of documents are generated simultaneously, the generation time is significant, which involves a drawback for users.

The aim of the invention is thus that of providing a solution for the problems and drawbacks mentioned above, among others.

SUMMARY

To do away with at least some of these drawbacks, the invention relates to a method for the automatic generation of at least one document, in particular such as a power of attorney intended to authorise a proxy to perform an action on behalf of a principal, the document containing a plurality of paragraphs displayed according to a layout, said plurality of paragraphs and said layout being dependent on at least a first parameter and a second parameter, the method using a database including at least:
 a layout database;
 a paragraph database;
 a list of values of said first parameter;
 a list of values of said second parameter, each combination of values of said parameters forming a generation context;
 a static index associating each generation context with a virtual document, a virtual document including at least one pointer pointing to a defined layout of the layout database and a plurality of pointers pointing to defined paragraphs of the paragraph database;
the method comprising:
 a step for selecting values of the first parameter and second parameter so as to form a generation context;
 a step for consulting the static index based on said generation context so as to obtain the virtual document associated with said generation context;
 a step for making a request in the database for layouts and paragraphs pointed to by the virtual document obtained; and
 a step for generating said document in an electronic format, containing the paragraphs returned by said request and the layout returned by said request.

Advantageously, by means of the invention, the content and the values per se of the elements of the document to be generated (layouts, paragraphs) are separated from the association logic of said elements (virtual document). Such a separation makes it possible to offer great flexibility for generating documents.

Moreover, the request step is rapid to implement given that each generation context is associated with a virtual document which includes the definition of all the elements of the document (layouts and paragraphs). In other words, by means of the virtual documents and the static index, the content of a document to be generated is determined directly on the basis of the generation context. Such a generation method limits the waiting time of a user who obtains the document sought instantaneously, the generation method thus being more effective since it requires less computer resources than methods according to the prior art.

Such a method is particularly advantageous for generating a large number of documents simultaneously, in particular proxies for a plurality of jurisdictions.

According to one aspect of the invention, the same paragraph of the paragraph database is pointed to by a plurality of different virtual documents. Similarly, the same layout is pointed to by a plurality of different virtual documents. In other words, a large number of different documents can be generated with a limited number of paragraphs and/or layouts. Pooling the paragraphs and layouts facilitates maintenance. Furthermore, the use of a static index makes it possible to accurately analyse the level of pooling of the paragraphs and layouts, which facilitates maintenance along with the creation of new documents to be generated. By way of example, if a paragraph is only pointed to by a few virtual documents, it may be advantageous to check whether it cannot be replaced by a similar paragraph with a higher pooling rate.

Advantageously, when a paragraph of the database is amended, the amendment made is passed onto all the documents generated from virtual documents pointing to said amended paragraph. In other words, a large plurality of documents to be generated is amended by only amending one paragraph of the database, the virtual document being advantageously not amended.

Preferably, the document comprises at least one paragraph comprising a fixed frame and at least one variable field, thus enabling customisation of said paragraph and/or a limitation of the number of paragraphs of the paragraph database.

Preferably in this case, the fixed frame of said paragraph is stored in the database with the other paragraphs.

Preferably again, the method comprises a step for inputting in an input form, or a step for retrieving in another database, the value of the variable field of said paragraph.

Preferably in this case, the method comprises a step for generating an input form based on the generation context and a step for inputting in the input form the value of the variable field of said paragraph. As such, the input form and thus the variable fields are correlated with the generation context, which facilitates and speeds up the input of the variable fields.

Preferably, the step for selecting at least one parameter is performed conditionally on the basis of the value of at least one other parameter. As such, the formation of combinations of values of compatible values is favoured, as the impossible combinations cannot be selected, which saves time for the user.

Preferably, a plurality of values of the same parameter are selected during the selection step so as to form a plurality of generation contexts and thus generate a plurality of documents. Such a method thus makes it possible to generate a large number of documents simultaneously and, in particular, proxies for a plurality of different jurisdictions. Such a multiple selection makes it possible to reduce the selection time of the user; indeed, in a single operation (i.e. a single implementation of the method according to the invention), the user can generate a batch of documents. Simultaneous generation of a plurality of documents is known to those skilled in the art as the term "batch". By means of the index, such a generation of a plurality of different document "in batch mode" is implemented rapidly.

Preferably again, the method comprises a step for consulting the static index so as to obtain the virtual documents associated with said generation contexts, a step for making a request in the database for layouts and paragraphs pointed to by said virtual documents obtained and a step for generating said documents in an electronic format, containing the paragraphs returned by said request and the layout returned by said request for each virtual document obtained. Advantageously, a plurality of different documents are generated simultaneously and conventionally by means of the static index.

According to one aspect of the invention, the static index includes the same virtual document associated with a plurality of different generation contexts so as to limit the number of virtual documents. Alternatively or cumulatively to the pooling of paragraphs and/or layouts, the virtual documents may also be pooled, such that the same virtual document is associated with a plurality of generation contexts. A large number of generation contexts enables a user to specifically choose the document to be generated. Pooling the virtual documents makes it possible to offer the user a wide selection of documents to be generated by retaining a limited number of virtual documents. As such, a user can form a very specific generation context corresponding to the user's expectations, while said generation context is associated with a virtual document in turn associated with further more general generation contexts. The specific wishes of the user are met while retaining a rapid, reliable generation method, the maintenance whereof is easy. Furthermore, by analysing the static index, it is possible to determine the level of pooling of each virtual document, which facilitates the maintenance of said static index.

By means of such a static index, a plurality of different generation contexts point to the same virtual document, which limits the number and variety of virtual documents and, consequently, the number and variety of paragraphs and/or layouts. In other words, a large number of different documents may be generated with a limited number of paragraphs and/or layouts. Pooling the paragraphs and layouts facilitates maintenance, which is facilitated further by pooling the virtual documents. In other words, the method according to the invention uses a pooling cascade (paragraphs, layouts, virtual documents).

The invention also relates to a system for the automatic generation of at least one document, in particular such as a power of attorney intended to authorise a proxy to perform an action on behalf of a principal, the document containing a plurality of paragraphs displayed according to a layout, said plurality of paragraphs and said layout being dependent on at least a first parameter and a second parameter, the generation system including:
 a database including at least:
  a layout database;
  a paragraph database;
  a list of values of said first parameter;
  a list of values of said second parameter, each combination of values of said parameters forming a generation context;
  a static index associating each generation context with a virtual document, a virtual document including at least one pointer pointing to a defined layout of the layout database and a plurality of pointers pointing to defined paragraphs of the paragraph database; and a generation module suitable for:

consulting the static index so as to obtain the virtual document associated with said predetermined generation context;

making a request in the database for layouts and paragraphs pointed to by the virtual document obtained;

generating a document in an electronic format, containing the paragraphs returned by said request and the layout returned by said request.

The system according to the invention has the same advantages as the method according to the invention.

Preferably, at least one paragraph including a fixed frame and at least one variable field, the generation module is suitable for retrieving the value of the variable field of said paragraph in an input form or in another database and for associating this value with the fixed frame of said paragraph.

Preferably, the system comprises means suitable for generating an input form based on the generation context.

BRIEF DESCRIPTION OF THE DRAWINGS

The invention will be understood more clearly on reading the description hereinafter, given merely by way of example, and with reference to the appended drawings wherein.

It should be noted that the figures disclose the invention in detail in order to implement the invention, said figures obviously being suitable for use to define the invention more clearly if necessary.

DETAILED DESCRIPTION

The invention relates, according to a first aspect, to a method for the automatic generation of at least one document, in particular such as a power of attorney intended to authorise a proxy to perform an action on behalf of a principal, for example a proxy authorising an attorney or consultant in industrial property to represent a client before a national or regional industrial property office for the management of one or more industrial property rights.

Figure 1:
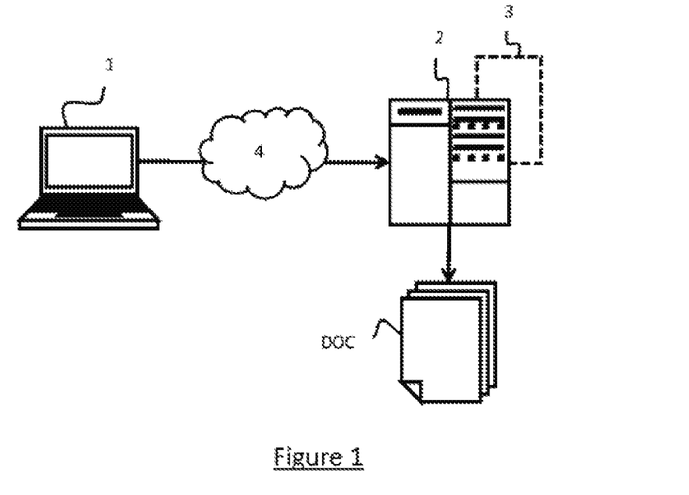
FIG. 1 is a schematic representation of a system for the automatic generation of documents from a data server database.

Preferably, with reference to FIG. 1, the generation method is implemented by a generation system including a data server 2 accessible by a user terminal 1 via a communication network 4, preferably, via the Internet. The data server 2 includes a database 3 from which a plurality of documents DOC can be generated. The data server 2 further includes a generation module (not shown) presented in the form of a computing unit, for example a processor.

Ordinarily, the user terminal 1 is a computer system including a central unit, a display device such as a screen, a pointing device such as a mouse and an input device such as a keyboard.

The database 3 is stored in a central processing unit of the data server 2 but it could be stored in a separate and/or remote storage device accessible by any ad hoc communication means. The database 3 may in turn be stored on a single storage device, or in a distributed manner on a plurality of separate and/or remote storage devices in relation to one another.

Preferably, the display and retrieval of the generated document DOC are carried out on the user terminal 1 via the communication network 4. Preferably, the data server 2 uses a web interface via which the user terminal 1 can select parameter values defining the nature of the document to be generated. The generated documents DOC are downloadable from this web interface and can be displayed thereby.

Figure 2:
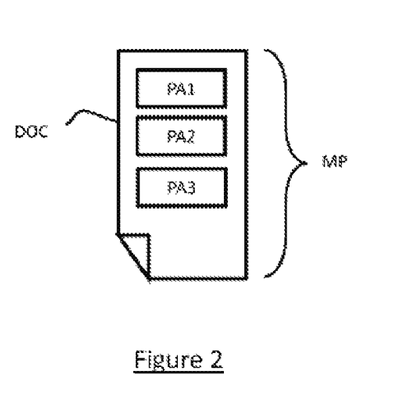
FIG. 2 is a schematic representation of a generated document.

With reference to FIG. 2, a document to be generated DOC includes a plurality of paragraphs PA1, PA2, PA3 which are presented according to at least one layout MP.

It is noted that the term layout MP denotes the set of display characteristics determining the position whereby and the manner wherein the content of the paragraphs are displayed in a document DOC. It may thus consist, besides the position characteristics, of the characteristics in respect of display font, display font size, display colour, underlining, borders, the presence of header(s) and/or footer(s) and/or logo(s), etc.

Figure 4:
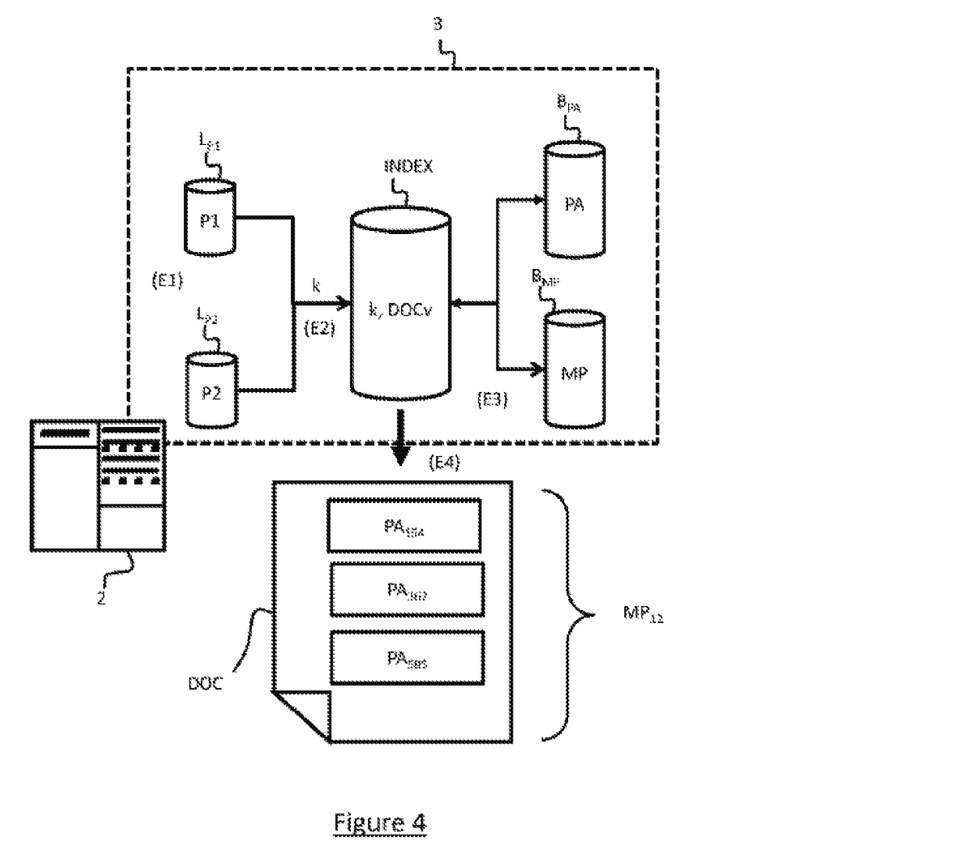
FIG. 4 is a schematic representation of said steps implemented in relation with the elements of the generation system database.

With reference to FIG. 4, the database 3 includes a paragraph database $B_{PA}$ and a layout database $B_{MP}$ which are, preferably, organised according to defined criteria so as to facilitate the maintenance and updating thereof. In order words, the database 3 contains the constituent elements of documents to be generated DOC.

According to the invention, the generation of a document DOC is dependent on at least a first parameter P1 and a second parameter P2. In this example, with reference to FIG. 4, the database 3 includes a list of values UN of the first parameter P1 and a list of values $L_{P2}$ of the second paragraph P2.

It is obvious that the invention is applicable to the generation of a document DOC on the basis of more than two parameters and to the generation of a plurality of documents on the basis of a plurality of parameters.

In this embodiment of the invention, each combination of values of the first parameter P1 and second parameter P2 forms a document generation context k. Nevertheless, some combinations of parameters are and form invalid generation contexts which are not associated with a virtual document.

By way of example, if the list of values of the first parameter P1 includes 2 elements and if the list of values of the second parameter P2 includes 3 elements, the potential number of combinations is equal to 6. Nevertheless, if a combination of values is not possible, this combination is not taken into account and/or results in an error message which is displayed on the terminal 1 illustrated in FIG. 1. Alternatively or cumulatively, the selection of the value of the second parameter P2 is determined by the value of the first parameter P1 selected. In other words, in this case, the system according to the invention and more specifically the parameter value selection interface inhibits the selection of mutually incompatible values.

Again with reference to FIG. 4, the database 3 includes a static index INDEX associating each generation context k with a virtual document DOCv. Each virtual document DOCv is a computing object including at least one pointer $PO_{MP}$ (not shown) pointing to a defined layout from the layout database $B_{MP}$ and a plurality of pointers $PO_{PA1}$, $PO_{PA2}$, $PO_{PA3}$ (not shown) pointing to defined paragraphs PA of the paragraph database $B_{PA}$.

In other words, a virtual document DOCv for a defined generation context k includes a link to the layout MP suitable for said generation context k and links to paragraphs PA suitable for said generation context k. As such, the static index INDEX determines the logical organisation of the constituent elements of a document (paragraphs and layout) to form a document to be generated DOC based on a generation context k.

The static index INDEX (and more specifically the content thereof) is predetermined or predefined before the implementation of the generation method. Each virtual document DOCv includes the set of links to form the document DOC for a defined generation context k. As such, it is simply necessary to precisely define the static index INDEX so as to define, update or create a new document to be generated DOC. As each virtual document DOCv includes the set of links (pointers) to form the document DOC for a defined generation context k, it is also possible, by analysing the static index INDEX, to determine which paragraphs PA and which layouts PM are used in which documents DOC. In other words, the analysis of the static index INDEX makes it possible to determine the level of pooling of each paragraph PA of the paragraph database $B_{PA}$ and of each layout MP of the layout database $B_{MP}$. By way of example, by means of this analysis, an unused paragraph of the paragraph database $B_{PA}$ can be deleted, or an infrequently used layout MP, wherein the level of pooling is low, can be deleted and replaced by a similar layout wherein the level of pooling is higher. A database of paragraphs $B_{PA}$ or layouts $B_{MP}$ including a reduced number of paragraphs PA and layouts MP is simpler to maintain and update.

In other words, the databases of layouts $B_{MP}$ and paragraphs $B_{PA}$ form stores of elements for the documents to be generated DOC, the static index INDEX forming the logical links for organising said elements in a document DOC based on the generation context k sought. As such, the stores of elements, on one hand, and the organisation logic of said elements, on the other, are separated, which speeds up the maintenance of the database 3 while offering great freedom of design.

Indeed, if a paragraph (and/or a layout) needs to be amended for a set of documents DOC, it is only necessary to amend said paragraph in the paragraph database $B_{PA}$. This amendment will have an impact on the set of documents DOC generated using virtual documents DOCv pointing to the paragraph (and/or layout) in question, without it being necessary to update the virtual documents DOCv, since the latter already point to the amended paragraph (and/or layout). As such, once again, no amendment of the virtual documents DOCv needs to be made, given that the organisation logic of said documents DOC is not affected by the amendment of a paragraph (and/or of a layout). Furthermore, as the relationships between, on one hand, the paragraphs and layouts used and, on the other, the documents DOC using same, are known (by means of the virtual documents DOCv establishing the links therebetween), it is possible to determine easily whether an amendment of a paragraph PA and/or a layout MP would be suitable for all the virtual documents DOCv pointing to said paragraph PA and/or said layout MP. This facilitates the maintenance of the database 3.

On the other hand, if the order, presence or absence of paragraphs PA in a document DOC for a defined generation context k1 needs to be amended, it is only necessary to amend the order, presence, or absence of the pointers $PO_{PA}$ of the virtual document DOCv1 associated with said defined generation context k1.

No amendment of the paragraph database $B_{PA}$ needs to be made given that the content of the paragraphs of said documents DOC is not affected. The same applies obviously for layouts.

According to one embodiment, a plurality of generation contexts k are associated with identical virtual documents DOCv (or even, preferably, with the same virtual document DOCv), and thus with identical pointers. By way of example, a first generation context k1 relating to the following parameter values "filing of a patent application; Belgium; specific" and a second generation context k2 relating to the following parameter values "filing of a patent application; Belgium; general" are associated with the same virtual document DOCv8. In other words, a generated document DOC for a general patent application proxy in Belgium is identical to a generated document DOC for a specific patent application proxy in Belgium. The user thus has the option of choosing a specific or general proxy while the generated documents are identical, as they are associated with the same virtual document. Such pooling of virtual documents makes it possible to limit the number of virtual documents of the index while enabling the user to choose specifically the document of his/her choice. Furthermore, the size of the database 3 is limited and the pooling of the paragraphs PA and layouts MP is increased, by pooling the virtual documents DOCv.

Moreover, in the future, should a general patent application proxy in Belgium be different to a specific patent application proxy in Belgium, it would simply be necessary to create a new virtual document DOCv9 for the second generation context k2 so as to add a link to a paragraph $PAX_{17}$ not present in the virtual document DOCv8. Such a new virtual document DOCv9 is simple to obtain as it is simply necessary to copy the virtual document DOCv8 and add a pointer $PO_{PA}$ to the missing paragraph $PAX_{17}$ from the paragraph database $B_{PA}$.

This pooling of paragraphs PA and layouts MP makes it possible to reduce the amount of information to be stored but also to facilitate maintenance. It facilitates for example the creation of new documents to be generated wherein the content is similar to other existing documents in the database 3. It also facilitates the application of the same amendment to a series of existing documents in the database 3.

Use

Further features and advantages of the invention will emerge more clearly on reading the description hereinafter of the preferred alternative embodiments and uses, which are given by way of non-limiting examples and with reference to the appended drawing wherein FIG. 4 represents schematically, among other elements, the main elements of an example of a system according to the invention enabling the use of a method according to the invention.

The present invention is hereinafter illustrated using an example of generation of documents consisting of proxies intended to enable a local representative to perform an action on behalf of an applicant before a local authority or body. It may consist for example, in the field of industrial property, of proxies for filing a patent application or registering a trademark, with competent local bodies.

In the example represented FIG. 4, the document DOC to be generated contains three paragraphs and a layout which determines the position of the paragraphs at defined locations, the display thereof with a certain display font, a certain size, underlined or not, in bold type or not.

In this example, the layout and the paragraphs of the document DOC are dependent on a number of parameters, in this instance:

a first parameter P1 consisting of the nature of the action for which the proxy is given, and a second parameter P2 consisting of the local body before which the action needs to be performed.

These parameters P1, P2 may adopt values grouped together lists of values $L_{P1}$, $L_{P2}$ stored in the database 3.

In the example, the list of values $L_{P1}$ of the first parameter P1 relating to the nature of the action comprises different possible values such as: filing, withdrawal, etc.

The list of values $L_{P2}$ of the second parameter P2 relating to the local body comprises different possible values such as: the European Patent Office (EPO), the United States Patent and Trademark Office, etc.

In this example, the various possible values for the second parameter P2 may be dependent on the possible values of the first parameter P1. In other words, the selection may be conditional, and more specifically the values of the second parameter P2 suitable for being selected are determined by the value chosen for the first parameter P1.

As such, the value P2="EPO" is a possible value of the second parameter P2 when the value of the first parameter P1 is "filing of a patent application", but is not a possible value of this second parameter P2 when the value of the first parameter P1 is ="registration of a trademark". In order words, the combination "registration of a trademark; EPO) is not a possible combination of parameters P1, P2. The set of possible for viable) combinations of values of parameters form the set of generation contexts k associated with virtual documents DOCv and thus enabling the generation of documents DOC.

Figure 3:
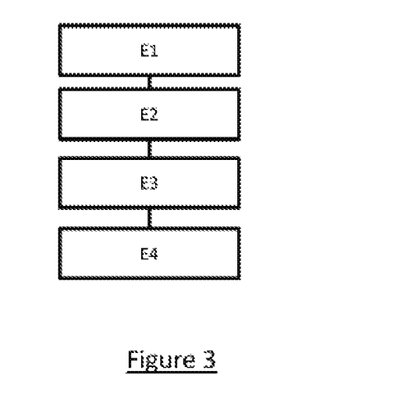
FIG. 3 is a general schematic representation of the steps of the automatic document generation method.

With reference to FIG. 3, steps E1-E4 of the generation method according to the invention will now be described in detail.

Selection Step E1

The method includes a step E1 for selecting a value of the first parameter P1 and a value of the second parameter P2 so as to form a generation context k.

In this example, the generation context k is formed on the basis of the selection of the value for the first parameter P1="filing of a patent application" and of the value for the second parameter P2="Belgium".

The combination (P1; P2) of the values "filing of a patent application: Belgium" forms the generation context k.

Consultation Step E2

The method further includes a step E2 for consulting the static index INDEX to obtain the virtual document DOCv associated with said generation context k, i.e., "filing of a patent application; Belgium".

In this example, the virtual document DOCv associated with said generation context k includes four pointers:

three paragraph pointers $PO1_{PA}$, $PO2_{PA}$, $PO3_{PA}$ and one layout pointer $PO_{MP}$.

The pointers $PO1_{PA}$, $PO2_{PA}$, $PO3_{PA}$, $PO_{MP}$ point respectively to the paragraphs $PA_{154}$, $PA_{367}$, $PA_{585}$ and the layout $MP_{12}$. Such pointers are advantageous as they make it possible to determine in a direct and predetermined manner the elements of the document DOC to be generated for the defined generation context k. In other words, there is no conditional step liable to slow down the generation of the document DOC.

Request Step E3

The method includes a request step E3 in the database 3 of the elements pointed to by the pointers $PO1_{PA}$, $PO2_{PA}$, $PO3_{PA}$, $PO_{MP}$ of the virtual document DOCv obtained for the defined generation context k, i.e., the paragraphs $PA_{154}$, $PA_{367}$, $PA_{585}$ and the layout $MP_{12}$.

Generation Step E4

The method further includes a generation step E4 of said document DOC in an electronic format, the document DOC containing the paragraphs returned by said request step E3, arranged according to the layout $MP_{12}$ also returned by the request step E3.

By means of this use, the generation of a document DOC is immediate due to the speed of the request step E3. This is particularly advantageous when the generation context k is formed using a large number of parameter values, the large number of values not impacting the processing time given that the static index is predetermined. The number of documents to be generated simultaneously thus has little impact on the document generation rate.

Furthermore, this is advantageous for forming a plurality of documents DOC from a single selection step E1. As such, it is possible to select a single value of a first parameter, for example "filing of a patent application", and a plurality of values of a second parameter ("Belgium", "Spain", Poland") to rapidly form three generation contexts k and as such automatically generate three documents DOC.

Paragraph with Variable Field

In one alternative use, at least one paragraph PA includes a fixed part, denoted "fixed frame", and at least one variable part, denoted "variable field".

As such, for example, only the fixed frame of a paragraph PA is stored in the database, the value of the variable field being suitable for being input directly by the user or obtained by a request in another database.

The step for generating the document then comprises a step for inputting in an input form, or a step for retrieving in another database, a value of the variable field, and a step for inserting this value into the paragraph PA with the fixed frame of the paragraph.

By way of example, the paragraph includes a fixed frame indicating the actions to be carried out on a European patent right for which the filing number is not completed. In other words, the filing number constitutes a variable field.

During the step for generating the document, the fixed frame of the paragraph pointed to is completed by the filing number input directly by the user or retrieved in another database. In the latter hypothesis, and for example, the filing number may be retrieved in another database including the list of the user's patent rights.

In this use, a paragraph PA including a single variable field has been described. Obviously, a paragraph PA could include a plurality thereof, for example, a filing number, a filing date, the name of an agent, etc.

According to one particular embodiment, the value of a variable field is chosen from a series of possible values presented to the user, for example in the form of a drop-down list of values wherein the user can choose one or a plurality of values for the variable field.

According to one particular embodiment, the method comprises a step for generating an input form which is dependent on the generation context. This offers great flexibility for the method which makes it possible, according to the generation context, to offer the user a form dependent on this context or not.

For example, in order to generate a proxy to transfer a patent application, a user selects the values of the parameters so as to determine the generation context of a transfer of a patent right. The virtual document associated with the defined generation context includes pointers pointing to the paragraphs PA including variable fields. Also, the generation system generates the display of an input form which comprises the variable fields to be completed for the set of paragraphs pointed to PA; these variable fields may for example make it possible to insert information on the transfer referenced by the proxy.

The user simply needs to complete all the variable fields to enable the generation of the proxy sought. Such a method makes it possible to customise a paragraph according to the generation context, which is advantageous and improves the quality and accuracy of the documents generated. Such a method is particularly advantageous for simultaneously generating a large number of documents wherein the same variable field is inserted.

The method for generating a document having been described, the invention also relates to a generation system for the use of said method.

The invention relates, according to a second aspect, to a system for the automatic generation of at least one document, in particular a data server 2, including a database 3 as described above and a generation module suitable for:
consulting the static index INDEX so as to obtain the virtual document DOCv based on a predetermined generation context k;
making a request in the database 3 for layouts MP and paragraphs PA pointed to by the virtual document obtained DOCv;
generating a document DOC in an electronic format, containing the paragraphs returned PA by said request and the layout MP returned by said request.

Advantageously, the generation system benefits from the same advantages as those associated with the generation method described above.

Advantageously, by means of the system according to the invention, the content and the values per se of the elements of the document to be generated (layouts, paragraphs) are separated from the association logic of said elements (virtual document). Such a separation makes it possible to offer great flexibility for generating documents by means of the generation module.

Moreover, the use of a request by the generation module is rapid given that each generation context is associated with a virtual document which includes the definition of all the elements of the document (layouts and paragraphs). In other words, by means of the static index, the content of a document to be generated is determined directly on the basis of the generation context. Such a generation method limits the waiting time of a user who obtains the document sought instantaneously, as the processing time of the system is thus minimised.

Such a system is particularly advantageous for generating a large number of documents simultaneously, in particular, proxies for a plurality of jurisdictions.

Also, the invention is not limited to a defined computer architecture, as represented in FIG. 4. Both the database 3 and the generation module can be implemented in a distributed manner or not, on one and the same unit or not. Moreover, the generation of the document DOC may equally well take place in the server 2 whereon the generation module is implemented or at a remote unit connected to the server 2 via a communication network, or both.

The entire description above is given by way of example and is not restrictive in respect of the invention.

In particular, the invention is not limited to the generation of proxies, let alone to the generation of proxies in the field of industrial property.

Moreover, information other than the content of the paragraphs and the layout thereof could be defined by the parameter(s). This may refer to the existence of a proxy or not, the paper to be used for the printing thereof, etc.

The invention claimed is:

1. A method for the automatic generation of at least one document comprising a plurality of paragraphs displayed according to a layout, said plurality of paragraphs and said layout being dependent on at least a first parameter and a second parameter, the method comprising:
accessing, using a computer terminal, a layout database, a paragraph database, a list of values of said first parameter, a list of values of said second parameter, a static index associating each of a plurality of generation contexts with one of a plurality of virtual documents maintained by a data server, each of the plurality of generation contexts representing a combination of a particular first value of the list of values of the first parameter and a particular second value from the list of values of the second parameter, said virtual document including at least one pointer pointing to a defined layout of the layout database and a plurality of pointers pointing to defined paragraphs of the paragraph database;
forming a requested generation context by selecting values of the first parameter and the second parameter using the data server;
obtaining the virtual document associated with said requested generation context from the static index using the data server;
requesting the layout and paragraphs pointed to by the virtual document obtained using the data server, at least one of said plurality of paragraphs including a fixed frame and at least one variable field;
generating said at least one document in an electronic format with the paragraphs and the layout returned by said request using the data server,
generating an input form based on the requested generation context using the data server and receiving in the input form a value of the variable field of said paragraph using the user terminal; and
inputting to the data server in the input form using the user terminal or retrieving in another database, the value of the variable field of said at least one paragraph.

2. The method according to 1, wherein the second parameter is selected conditionally on the basis of the value of first parameter.

3. The method according to claim 2, wherein a plurality of values of the first and second parameters are selected to form a plurality of generation contexts generating a plurality of documents.

4. The method according to claim 3, further comprising generating said at least one documents in an electronic format with the paragraphs and the layout returned for each virtual document obtained using the data server.

5. The method according to claim 4, wherein the static index includes the same virtual document associated with a plurality of different generation contexts.

6. The method according to claim 1, wherein the at least one document is a power of attorney document intended to authorize a proxy to perform an action on behalf of a principal.

7. A system for the automatic generation of at least one document comprising a plurality of paragraphs displayed according to a layout, said plurality of paragraphs and said layout being dependent on at least a first parameter and a second parameter, the system comprising:
a data server that maintains:
a layout database,
a paragraph database,
a list of values of said first parameter, a list of values of said second parameter, each combination of values of said first and second parameters forming a generation context, and a static index associating each generation context with a virtual document, said virtual document including at least one pointer pointing to a defined layout of the layout database and a plurality of pointers pointing to defined paragraphs of the paragraph database; and instructions that configure a processor in the data server to:

obtain the virtual document associated with a predetermined generation context determined from a particular value of the first parameter and a particular value of the second parameter from the static index;

request the layouts and the paragraphs pointed to by the virtual document obtained at least one of said plurality of paragraphs including a fixed frame and at least one variable field;

generate the at least one document in an electronic format with the paragraphs and the layout returned by said request;

generate an input form based on the requested generation context using the data server and receiving in the input form a value of the variable field of said paragraph using the user terminal; and input to the data server in the input form using the user terminal or retrieving in another database, the value of the variable field of said at least one paragraph.

8. The system according to claim 7, wherein at least one paragraph includes a fixed frame and at least one variable field; the instructions further configure the processor to retrieve a value of the variable field of said at least one paragraph in an input form or in another database and for associating the value of the variable field with the fixed frame of said paragraph.

9. The system according to claim 8, the instructions further configure the processor to generate an input form based on the generation context.

10. The system according to claim 7, wherein the at least one document is a power of attorney document intended to authorize a proxy to perform an action on behalf of a principal.

* * * * *